July 28, 1925.
W. S. GRAHAM
PLOW ADJUSTING DEVICE
Filed March 13, 1922
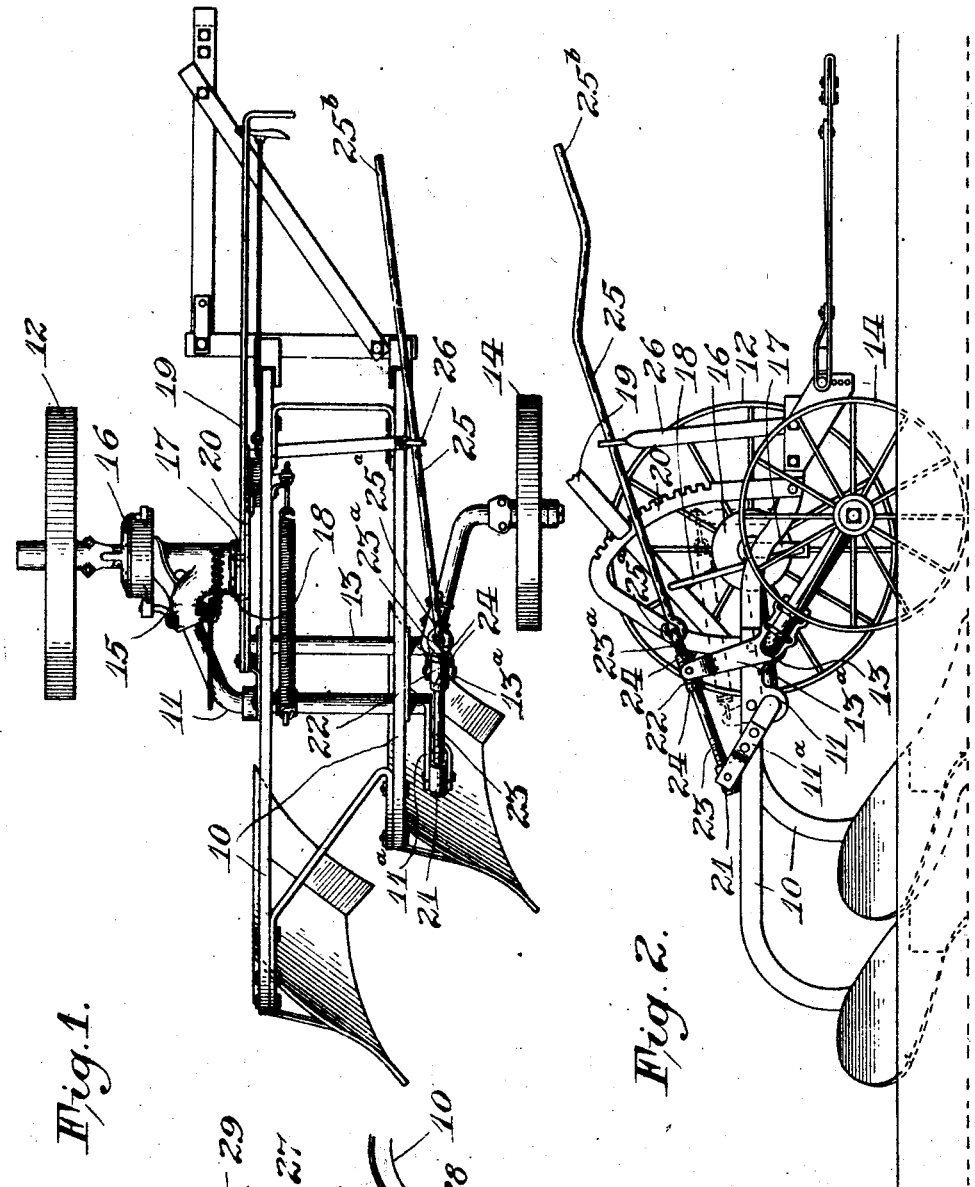
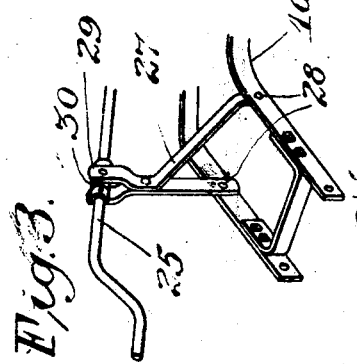
Inventor.
William S. Graham,
By
Atty.

Patented July 28, 1925.

1,547,805

UNITED STATES PATENT OFFICE.

WILLIAM S. GRAHAM, OF CANTON, ILLINOIS, ASSIGNOR TO INTERNATIONAL HARVESTER COMPANY, A CORPORATION OF NEW JERSEY.

PLOW-ADJUSTING DEVICE.

Application filed March 13, 1922. Serial No. 543,169.

*To all whom it may concern:*

Be it known that I, WILLIAM S. GRAHAM, a citizen of the United States, residing at Canton, in the county of Fulton and State of Illinois, have invented certain new and useful Improvements in Plow-Adjusting Devices, of which the following is a full, clear, and exact specification.

This invention relates to improvements in adjusting mechanism for light tractor plows, and particularly to a substitute for the usual hand lever heretofore employed for adjusting the front furrow wheel of power lift plows.

The object of the invention is to eliminate the hand lever, which usually is obliged to swing with the crank axle carrying the furrow wheel, and to substitute therefor a simple form of adjusting mechanism which will be accessible at all times to the driver of the tractor pulling the plow.

This object is accomplished by providing a simple form of screw adjustment for the front furrow wheel having a forwardly projecting operating shaft supported on the plow in a novel manner and connected to the screw in a manner not to interfere with the movement of the furrow wheel, and to permit adjustment of the wheel whether the plows are raised or lowered.

Referring to the drawings—

Fig. 1 is a plan view of the plow embodying the invention;

Fig. 2 is a side elevation of the same; and

Fig. 3 is a detail view of a modified form.

The invention is illustrated in connection with a light tractor plow comprising a pair of rigidly connected plow beams 10 supported on a crank axle 11 carrying the land wheel 12, and a second forwardly spaced crank axle 13 carrying the furrow wheel 14. The crank axle 11 is provided with a bracket 15 which has bearings for a stub shaft on which the land wheel 12 is mounted, and which also serves to support a power lift mechanism comprising a clutch 16 through which the stub shaft is intermittently rotated, the stub shaft having its inner end formed with a crank 17 connected by a link 18 with a lever 19 pivoted on the plow beams and adjustably locked to a rack 20. This mechanism is not further described as it does not differ from power lift mechanisms known to the art, it being sufficient for the purposes of this disclosure to understand that lever 19 serves to adjust the land wheel axle, and that the action of the clutch, which is connected by link 18 to this lever, serves to swing the crank of the land wheel axle upwardly and downwardly to raise and lower the plows. The furrow side end of the land wheel axle 11 is provided with an upwardly directed crank $11^a$, which is forked, and between the arms of which there is pivoted a threaded sleeve 21. The furrow wheel axle 13 had a similar crank or arm $13^a$ fixed thereto at its angle, and in the fork of this arm there is mounted a bearing sleeve 22. A screw shaft 23 is mounted in bearing sleeve 22, and formed with a threaded end in engagement with sleeve 21, the movement of the shaft 23 longitudinally through sleeve 22 being prevented by suitable means, such as stop collars 24. The forward end of screw shaft 23 is formed with an eye $23^a$, and a forwardly projecting operating rod 25 has an eye $25^a$ interlocked therewith. The operating rod 25 is supported on a standard 26 preferably formed of a pair of converging bars fixed to opposite sides of the frame and having an aperture in its upper end receiving the rod in the manner to permit it to slide longitudinally therein. The forward end of rod 25 is provided with an operating crank $25^b$ positioned forwardly of the plows so as to be readily accessible to a driver seated on a tractor.

In the modified construction of Fig. 3, a pivoted standard 27 is substituted for the fixed standard 26 of the other form, and in lieu of the sliding connection for rod 25, the upper end of standard 27 is formed as a fork 29 in which is pivoted a sleeve 30 in which rod 25 is journaled and retained by suitable means such as stop collars. With this construction, standard 27 will be rocked by movement of rod 25 as the plows are raised or lowered.

It will be evident that this construction provides an adjustable connection through shaft 23 between the land and furrow wheel axles, and that they will be jointly swung by operation of the power lift mechanism and jointly adjusted and locked in adjusted position by the hand lever 19. When, however, it is desired to adjust the furrow wheel alone, it will only be necessary to rotate the rod 25, thereby causing screw shaft 23 to either increase or shorten the distance between the arms 11ª and 13ª, consequently swinging the furrow wheel axle 13 and causing the furrow wheel to be elevated or lowered to the extent desired. Owing to the universal joint connection between screw shaft 23 and operating shaft 25 adjustment of the furrow wheel is possible in any position of the plows, and as the operating shaft 25 is movable in a longitudinal direction either on or with its support it will not interfere with the lifting and lowering of the plows, and its operating crank will always be in position to be reached by the operator.

While it is admittedly not new to connect the land and furrow wheel axles of a power lift plow by means of a screw shaft, the construction and arrangement of the operating rod and its connection to the screw shaft present a simple and novel combination of elements for regulating the furrow wheel.

I claim as my invention:

1. In a tractor gang plow having rigidly connected plow beams and cranked axles for the land and furrow wheels journaled on said beams, the combination with the furrow wheel axle of adjusting means therefor comprising an arm fixed to the furrow wheel axle; a second arm connected to the land wheel axle, means including a hand lever for locking said land wheel axle and second arm in adjusted position, bearing collars on said arms, a shaft revoluble in said collars, the collar on said first mentioned arm being held against movement longitudinally of the shaft and the other being in threaded engagement therewith, and means for turning said shaft to adjust the furrow wheel comprising a rod having a universal joint connection with said shaft and moving longitudinally with said shaft as the axles are swung, said rod extending forwardly in advance of the beams, and a swinging standard on the forward end of the beams movably supporting said rod.

2. In a tractor gang plow having rigidly connected plow beams supported on wheels having cranked axles journaled on the beams, the combination with the axles of adjusting mechanism comprising a connection between the axles for causing them to swing in unison when the plows are raised and lowered, and means for adjusting said connection to vary the relative positions of the wheels including a forwardly extending rod flexibly joined to said connection and provided with an operating handle on its forward end, said rod moving in a fore and aft direction when the axles are moving, and a hinged standard carried by the plow on which said rod is pivotally supported.

In testimony whereof I affix my signature.

WILLIAM S. GRAHAM.